United States Patent
Kim et al.

(10) Patent No.: US 10,571,014 B2
(45) Date of Patent: Feb. 25, 2020

(54) INTEGRATED APPARATUS FOR IMPLEMENTING SHIFT LOCK AND SHIFT LOCK RELEASE FUNCTIONS OF AUTOMATIC TRANSMISSION VEHICLE

(71) Applicants: HYUNDAI MOTOR COMPANY, Seoul (KR); KIA MOTORS CORPORATION, Seoul (KR); SL Corporation, Daegu (KR)

(72) Inventors: Sun Il Kim, Hwaseong-si (KR); Eun Sik Kim, Gwangmyeong-Si (KR); Jee Hyuck Choi, Gunpo-si (KR); Jeong Seon Min, Hwaseong-si (KR); Seong Uk Bae, Anyang-si (KR); Sun Joo Kim, Suwon-si (KR); Jin Won Ko, Bucheon-si (KR); Yang Rae Cho, Suwon-si (KR); Man Young Cheon, Gyeongsan-si (KR)

(73) Assignees: Hyundai Motor Company, Seoul (KR); Kia Motors Corporation, Seoul (KR); SL Corporation, Daegu (KR)

( * ) Notice: Subject to any disclaimer, the term of this patent is extended or adjusted under 35 U.S.C. 154(b) by 205 days.

(21) Appl. No.: 15/825,578

(22) Filed: Nov. 29, 2017

(65) Prior Publication Data

US 2018/0245683 A1 Aug. 30, 2018

(30) Foreign Application Priority Data

Feb. 24, 2017 (KR) .................. 10-2017-0025027

(51) Int. Cl.
*F16H 59/02* (2006.01)
*F16H 61/22* (2006.01)
(Continued)

(52) U.S. Cl.
CPC ....... *F16H 59/0278* (2013.01); *F16H 59/105* (2013.01); *F16H 61/22* (2013.01);
(Continued)

(58) Field of Classification Search
CPC .... F16H 59/0278; F16H 59/105; F16H 59/54; F16H 61/22; F16H 61/16; F16H 61/18;
(Continued)

(56) References Cited

U.S. PATENT DOCUMENTS

| | | | | |
|---|---|---|---|---|
| 4,061,250 A | * | 12/1977 | Tada | B05B 11/3014 222/321.8 |
| 4,905,802 A | * | 3/1990 | Gotoh | F16H 59/10 192/220.4 |
| 5,078,242 A | * | 1/1992 | Ratke | B60R 25/02144 192/220.4 |
| 5,402,870 A | * | 4/1995 | Osborn | F16H 59/10 192/220.7 |

(Continued)

FOREIGN PATENT DOCUMENTS

KR 20-0373783 Y1 1/2005

*Primary Examiner* — Victor L Macarthur
*Assistant Examiner* — T. Scott Fix
(74) *Attorney, Agent, or Firm* — Morgan, Lewis & Bockius LLP

(57) ABSTRACT

An integrated apparatus for implementing shift lock and shift lock release functions of an automatic transmission vehicle includes a shift lock solenoid having a plunger capable of moving forward and backward; a shift lock release lever forcibly moving the plunger backward by coming into contact with the plunger when moving toward the shift lock solenoid; and a casing coupling the shift lock solenoid and shift lock release lever to be integrally modularized.

11 Claims, 11 Drawing Sheets

(51) Int. Cl.
*F16H 59/10* (2006.01)
*F16H 59/54* (2006.01)

(52) U.S. Cl.
CPC ........ *F16H 59/54* (2013.01); *F16H 2059/026* (2013.01); *F16H 2059/0221* (2013.01); *F16H 2059/0282* (2013.01); *F16H 2061/223* (2013.01)

(58) Field of Classification Search
CPC ....... F16H 2059/0221; F16H 2059/026; F16H 2059/0282; F16H 2061/223; F16H 2061/185; F16H 2061/226; F16H 2061/161; B60R 25/066; B60R 25/086; B60T 2260/00; B60T 2260/04
USPC ...................................................... 74/473.21
See application file for complete search history.

(56) References Cited

U.S. PATENT DOCUMENTS

| | | | | |
|---|---|---|---|---|
| 5,465,818 | A | * | 11/1995 | Osborn ................... F16H 59/10 192/220.4 |
| 5,799,517 | A | * | 9/1998 | Hattori ............. B60R 25/02144 192/220.4 |
| 6,676,564 | B2 | * | 1/2004 | Gruden ............. B60R 25/02144 335/257 |
| 2002/0029951 | A1 | * | 3/2002 | Beattie ................ F16H 59/0204 192/220.4 |
| 2004/0118237 | A1 | * | 6/2004 | Kato .................... F16H 59/105 74/473.3 |
| 2008/0022805 | A1 | * | 1/2008 | Howe .................... F16H 61/22 74/527 |
| 2015/0000451 | A1 | * | 1/2015 | Yamamoto .......... F16H 59/0204 74/473.24 |

* cited by examiner

INTEGRATED APPARATUS FOR IMPLEMENTING SHIFT LOCK AND SHIFT LOCK RELEASE FUNCTIONS OF AUTOMATIC TRANSMISSION VEHICLE

CROSS REFERENCE TO RELATED APPLICATION

The present application claims benefit of priority to Korean Patent Application No. 10-2017-0025027, filed Feb. 24, 2017, the entire content of which is incorporated herein for all purposes by this reference.

TECHNICAL FIELD

The present disclosure relates to an integrated apparatus for implementing shift lock and shift lock release functions of an automatic transmission vehicle, in which a shift lock solenoid and a shift lock release lever are integrally modularized by one casing.

BACKGROUND

In general, a shift lever, which is disposed near the driver's seat in an automatic transmission vehicle, is configured such that a lower end thereof is rotatably hinged to be selectively positioned to a P (parking)—position, an R (reverse)—position, an N (neutral)—position, and a D (drive)—position while moving along a groove of a range formed in the detent plate according to a driver's operation.

The automatic transmission vehicle also has a shift lock function to prevent the shift lever from being moved to P→R shift or N→R shift of the shift lever unless a driver presses down the brake pedal, whereby it is possible to prevent the occurrence of a safety accident due to carelessness of the driver.

An apparatus for implementing the shift lock function includes a shift lock solenoid and a shift lock lever.

When the shift lever is in the P position and the driver does not press the brake pedal, an end of the shift lock lever is held in a body of the shift lever, thereby preventing the shift lever from being undesirably changed from the P position to the R position or to another shift position.

Further, if the driver presses the brake pedal while the shift lever in the P position, a sensor detects the operating state of the brake pedal and transmits it to a body control module (BCM), the shift lock solenoid is operated by the control of the BCM, and the shift lock lever is operated in conjunction with the operation of the shift lock solenoid. Accordingly, the shift lever is released by releasing the end of the shift lock lever held in the body of the shift lever, whereby the shift lever can be moved from the P position to the R position or another shift position according to the driver's will.

Further, the automatic transmission vehicle has a shift lock release function other than the shift lock function, wherein the shift lock release function is used when the shift lever fails to be released due to a failure of the shift lock solenoid, etc. even though the driver has stepped on the brake pedal while the shift lever is in the P position.

The shift lock release lever is provided to implement the shift lock release function, wherein when shift lock release lever is manually operated, the plunger of the shift lock solenoid is forcibly moved, and the end of the shift lock lever held in the body of the shift lever is forcibly released, thereby releasing the locked state of the shift lever.

However, in the conventional structure, the shift lock solenoid and the shift lock lever are mounted to have a connection structure with each other at independent positions, and the shift lock lever and the shift lock release lever are also mounted to have a connection structure with each other at independent positions. In other words, the three components, that is, the shift lock solenoid, the shift lock lever, and the shift lock release lever are installed in separate positions, respectively. As a result, it is problematic in that an installation space must be secured individually for each component, and the overall size is increased when assembled with the shift lever.

It is further problematic in that the three components, that is, the shift lock solenoid, the shift lock lever, and the shift lock release lever are assembled to have connection structures with each other at independent positions, it is difficult to secure the quality due to a large variation in assembly tolerance at the connection part between the components, and a quality problem may be caused due to the slow response in performing the shift lock or shift lock release.

It is further problematic in that the separate assembly structure as described above may lead to excessive assembly time and reduced productivity.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose an integrated apparatus for implementing shift lock and shift lock release functions of an automatic transmission vehicle, in which a shift lock solenoid and a shift lock release lever for implementing shift lock and shift lock release functions are integrally modularized by one casing, whereby the installation space is minimized, and accordingly, it is possible to reduce an overall size and weight, and it is possible to considerably reduce the assembly variation, thereby ensuring excellent quality. Further, it is possible to ensure wick response in performing the shift lock or shift lock release, thereby improving quality.

The present disclosure is further intended to propose an integrated apparatus for implementing shift lock and shift lock release functions of an automatic transmission vehicle, in which the shift lock function is implemented by using only the shift lock solenoid, and the shift lock release function is implemented by the shift lock release lever directly activating the shift lock solenoid, which enables eliminating the use of a conventional shift lock lever, whereby it is possible to reduce the number of components, cost, and weight. Further, it is possible to improve productivity by shortening the assembling time.

In order to achieve the above object, according to one aspect of the present disclosure, there is provided, an integrated apparatus for implementing shift lock and shift lock release functions of an automatic transmission vehicle, the integrated apparatus including: a shift lock solenoid having a plunger capable of moving forward and backward; a shift lock release lever forcibly moving the plunger backward by coming into contact with the plunger when moving toward the shift lock solenoid; and a casing coup the shift lock solenoid and shift lock release lever to be integrally modularized.

The integrated apparatus may further include a lever spring having opposite ends thereof supported by the shift lock release lever and the casing, respectively, and providing a restoring force when the shift lock release lever moves.

The casing may be fixedly coupled to a shift lever housing; the shift lever housing may be rotatably provided with a shift lever body having a shift lever; and the plunger may have a first end thereof penetrating the shift lever housing to face the shift lever body.

The plunger may penetrate the shift lock solenoid such that opposite ends thereof are exposed outside the shift lock solenoid.

The plunger may have a first end thereof facing a shift lever body coupled to a shift lever housing, and a second end thereof disposed on a moving path of the shift lock release lever.

The plunger may be moved backward away from the shift lever body when power is applied to the shift lock solenoid, and may be moved forward toward the shift lever body by an elastic force of a plunger spring when power is off.

The shift lever body may have a plunger insertion groove; and a shift lock function may be implemented when the first end of the plunger is inserted in the plunger insertion groove.

A plunger plate having a diameter larger than a diameter of the plunger may be coupled to the second end of the plunger; the shift lock release lever may come into contact with the plunger plate when moving toward the shift lock solenoid; when the shift lock release lever and the plunger plate are brought into contact with each other, the plunger may be forcibly moved backward away from the shift lever body by receiving a moving force of the shift lock release lever; and when the plunger is forcibly moved backward, a shift lock release function may be implemented.

The shift lock solenoid may be coupled to a longitudinal middle position of the casing; the shift lock release lever may be coupled to the casing at a location above the shift lock solenoid; the shift lock solenoid may integrally have a solenoid terminal; and a junction between the solenoid terminal and a power line may be covered by a lower part of the casing based on the shift lock solenoid.

The casing may include: an upper part with the shift lock release lever coupled thereto; a middle part with the shift lock solenoid coupled thereto; and the lower part covering the junction between the solenoid terminal and the power line, wherein the upper, middle, and lower parts are fixedly coupled to the shift lever housing, respectively.

The shift lock release lever may include: an operation part being coupled to the casing to be movable up and down at a location above the shift lock solenoid, and receiving an operating force of a driver; a body part extending downward from a lower portion of the operation part, and guiding up and down movements of the shift lock release lever; and a rod part protruding downward from the body part, and coming into contact with the plunger plate when the shift lock release lever moves down.

A cross-sectional area of the shift lock release lever is largest in the operation part, smallest in the rod part, and middle in the body part.

Each of opposite side walls of the casing with the body part inserted thereinto may have an oblong slot hole; a stopper protrusion provided in the body part may be inserted into the slot hole; and both the slot hole and the stopper protrusion may guide up and down movements of the shift lock release lever, and may prevent the shift lock release lever from being separated from the casing.

The integrated apparatus for implementing shift lock and shift lock release functions of an automatic transmission vehicle according to the present disclosure is advantageous in that a shift lock solenoid and a shift lock release lever for implementing shift lock and shift lock release functions are integrally modularized by one casing, whereby the installation space is minimized, and accordingly, it is possible to reduce an overall size and weight, and it is possible to considerably reduce the assembly variation, thereby ensuring excellent quality. Further, it is possible to ensure quick response in performing the shift lock or shift lock release, thereby improving quality.

The present disclosure is further advantageous in that the shift lock function is implemented by using only the shift lock solenoid, and the shift lock release function is implemented by the shift lock release lever directly activating the shift lock solenoid, which does not require a conventional shift lock lever, whereby it is possible to reduce the number of components, cost, and weight. Further, it is possible to improve productivity by shortening the assembling time.

BRIEF DESCRIPTION OF THE DRAWINGS

The above and other objects, features and other advantages of the present disclosure will, be more clearly understood from the following detailed description when taken in conjunction with the accompanying drawings, in which.

DETAILED DESCRIPTION

Figure 1:
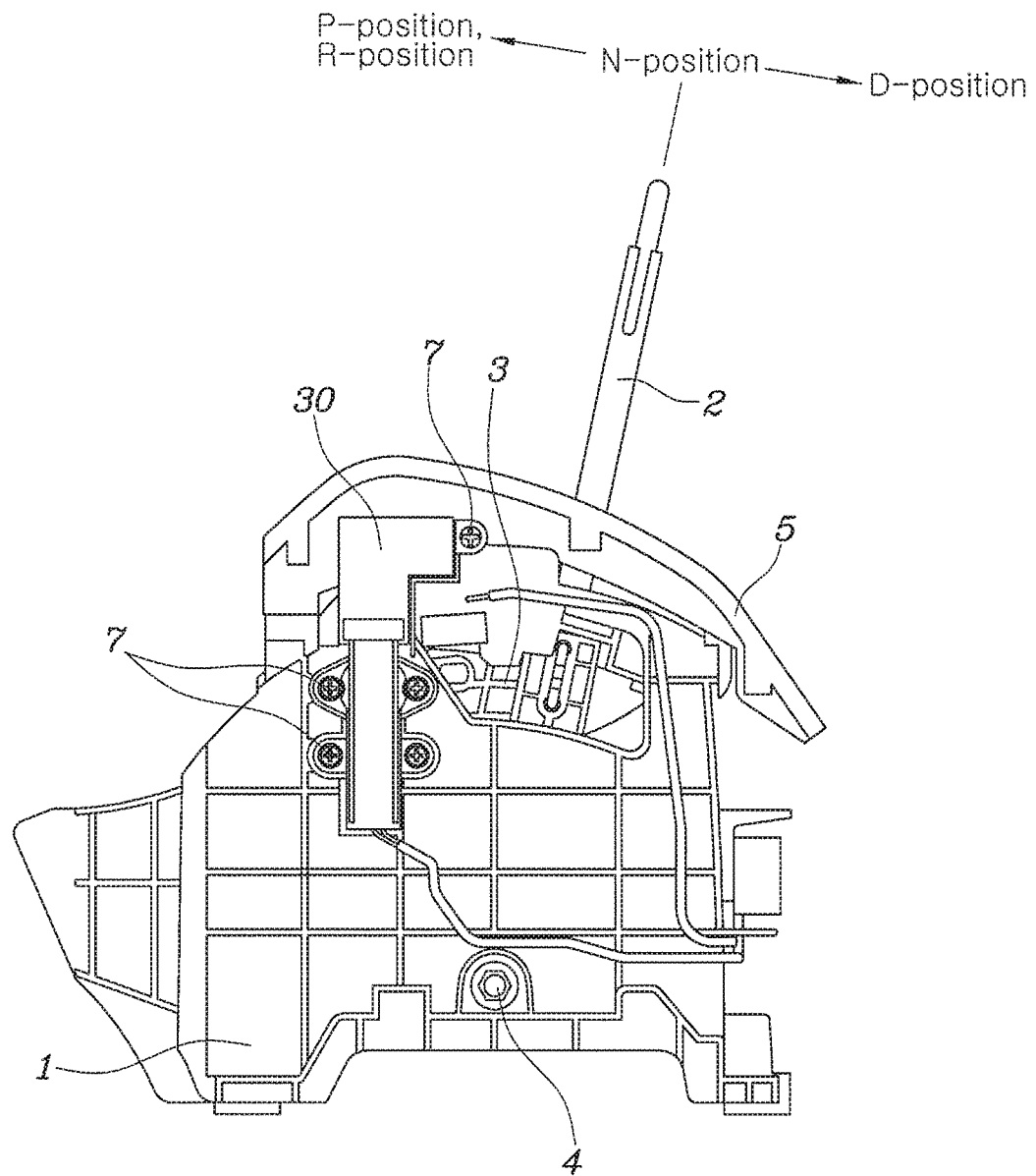
FIG. 1 is a side view showing a shift lever apparatus, to which an integrated apparatus for implementing shift lock and shift lock release functions of an automatic transmission vehicle according to the present disclosure is coupled.
Figure 2:
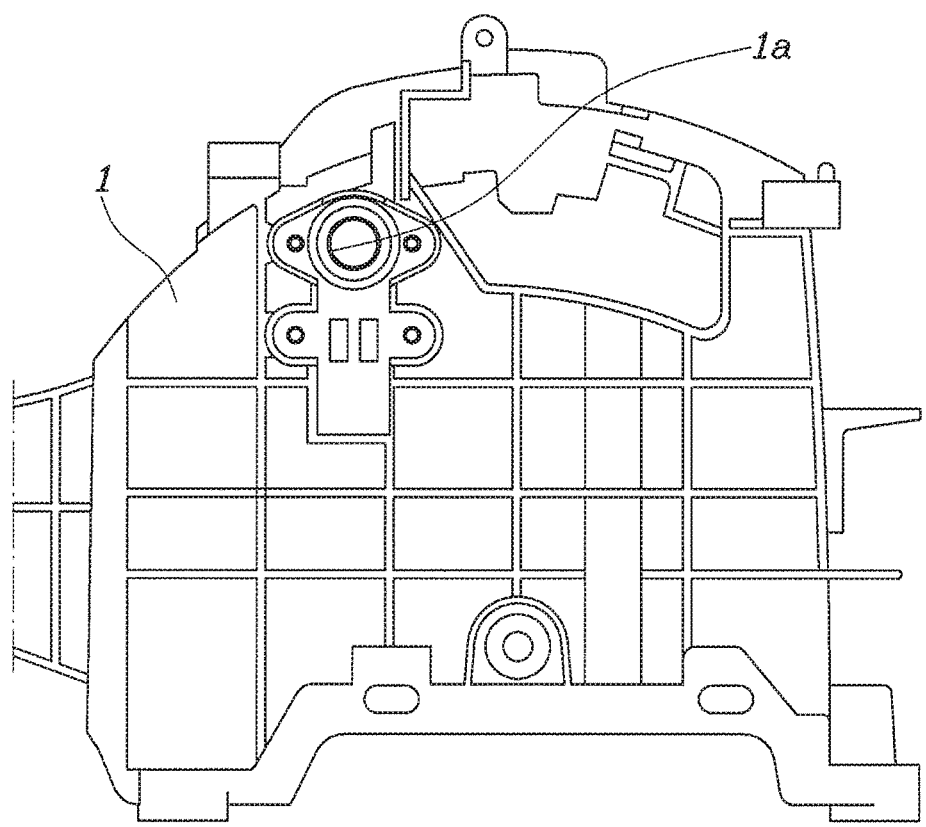
FIG. 2 is a side view showing a shift lever housing of FIG. 1.

Hereinbelow, an integrated apparatus for implementing shift lock and shift lock release functions of an automatic transmission vehicle according to an exemplary embodiment of the present disclosure will be described in detail with reference to the accompanying drawings.

As shown in FIGS. 1 to 11, in an automatic transmission vehicle, a shift lever housing 1 is provided at a side of a driver's seat to be fixed to a vehicle body, and a lower end of the shift lever body 3 with a shift lever 2 is coupled to the shift lever housing 1 to be rotatable forward and backward about a hinge shaft 4.

Accordingly, when a driver manipulates the shift lever 2 forward and backward, the shift lever 2 is selectively positioned to a P (parking)—position, an R (reverses—position, an N (neutral)—position, and a D (drive)—position while moving along a groove of a range formed in a detent plate 5, whereby the gear of the transmission is determined.

An integrated apparatus according to an embodiment of the present disclosure, which is configured such that a shift lock solenoid 10 and a shift lock release lever 20 for implementing shift lock and shift lock release functions are integrally modularized by one casing 30, is fixedly coupled to a side of the shift lever housing 1. The shift lock release lever 20 includes a first slanted surface 20a at a lower end thereof.

In other words, the integrated apparatus according to the present disclosure includes: a shift lock solenoid 10 provided with a plunger 11 capable, of moving forward and backward; a shift lock release lever 20 forcibly moving the plunger 11 backward by coming into contact with the plunger 11 when moving toward the shift lock, solenoid 10; a casing 30 coupling the shift lock solenoid 10 and shift lock release lever 20 to be integrally modularized; and a lever spring 40 being configured such that opposite ends thereof are supported by the shift lock release lever 20 and the casing 30, respectively, and providing a restoring force when the shift lock release lever 20 moves.

The casing 30 is fixedly coupled to a shift lever housing 1; the shift lever housing 1 is rotatably provided with a shift lever body 3 provided with a shift lever 2; and the plunger 11 is configured such that a first end thereof face the shift lever body 3 through a hole 1a of the shift lever housing 1.

The plunger 11 penetrates the shift lock solenoid 10 such that opposite ends thereof are exposed outside the shift lock solenoid 10. Based on the state where the casing 30 is coupled to the shift lever housing 1, referring to FIG. 8, the plunger 11 is configured such that a first end thereof protruding toward the left side of the shift lock solenoid 10 faces the shift lever body 3 through the hole 1a of the shift lever housing, and a second end thereof protruding toward the right side of the shift lock solenoid 10 is disposed on a moving path of the shift lock release lever 20 inside the casing 30.

The plunger 11 moves backward away from the shift lever body 3 when power is applied to the shift lock solenoid 10, and moves forward toward the shift lever body 3 by an elastic force of a plunger spring 12 when the power is off.

when the driver presses a brake pedal, power is applied to the shift lock solenoid 10 by the control of a body control module (BCM) having received a signal from a brake pedal sensor, and when the power is applied to the shift lock solenoid 10, the plunger 11 moves backward away from the shift lever body 3 by a magnetic force while overcoming an elastic force of the plunger spring 12.

Further, when the driver releases his/her foot from the brake pedal, the power applied to the shift lock solenoid 10 is cut off by the control of the BCM, and when the power is cut off, the magnetic force of the solenoid is extinguished so that the plunger 11 moves forward toward the shift lever body 2 by the elastic force of the plunger spring 12.

In order to apply power to the shift lock solenoid 10, the shift lock solenoid 10 is integrally provided with a solenoid terminal 13, and the solenoid terminal 13 is electrically connected with a terminal 6a of a power line 6.

The shift lever body 3 is provided with plunger insertion grooves 3a and 3b; and a shift lock function is implemented when the first end of the plunger is inserted in the plunger insertion grooves 3a and 3b.

Figure 10:
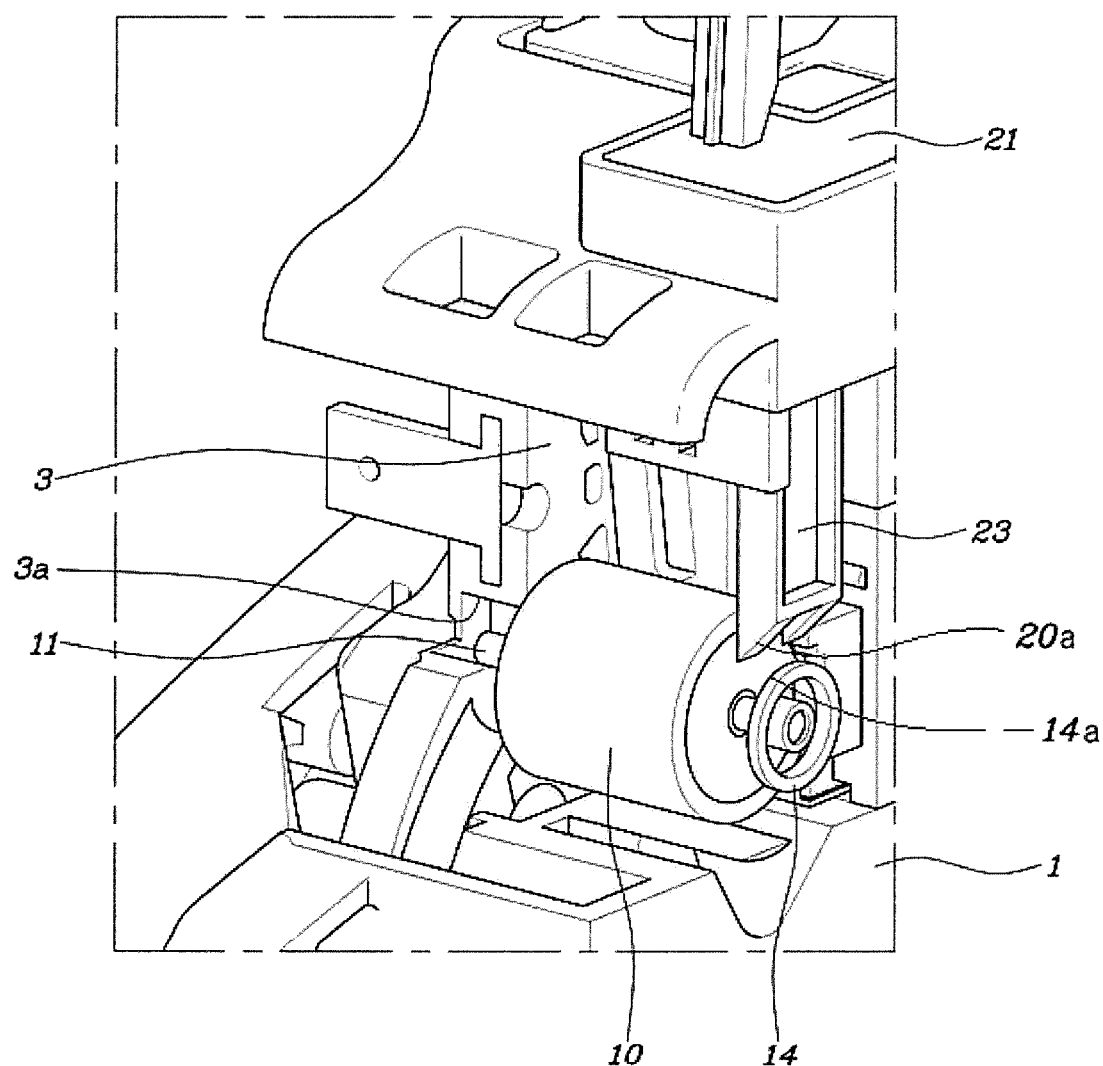
FIGS. 10 and 11 are views showing states where the shift lock function and the shift lock release function are implemented by the integrated apparatus according to the present disclosure.

In other words, as the power applied to the shift lock solenoid 10 is cut off, the plunger 11 moves forward toward the shift lever body 2 by the elastic force of the plunger spring 12, whereby as shown in FIG. 10, the first end of the plunger 11 passes through the hole 1a of the shift lever housing 1 and is inserted in the plunger insertion grooves 3a and 3b formed in the shift lever body 3, so that it is possible to manipulate the shift lever 2, that is, shift lock function is implemented.

Figure 3:
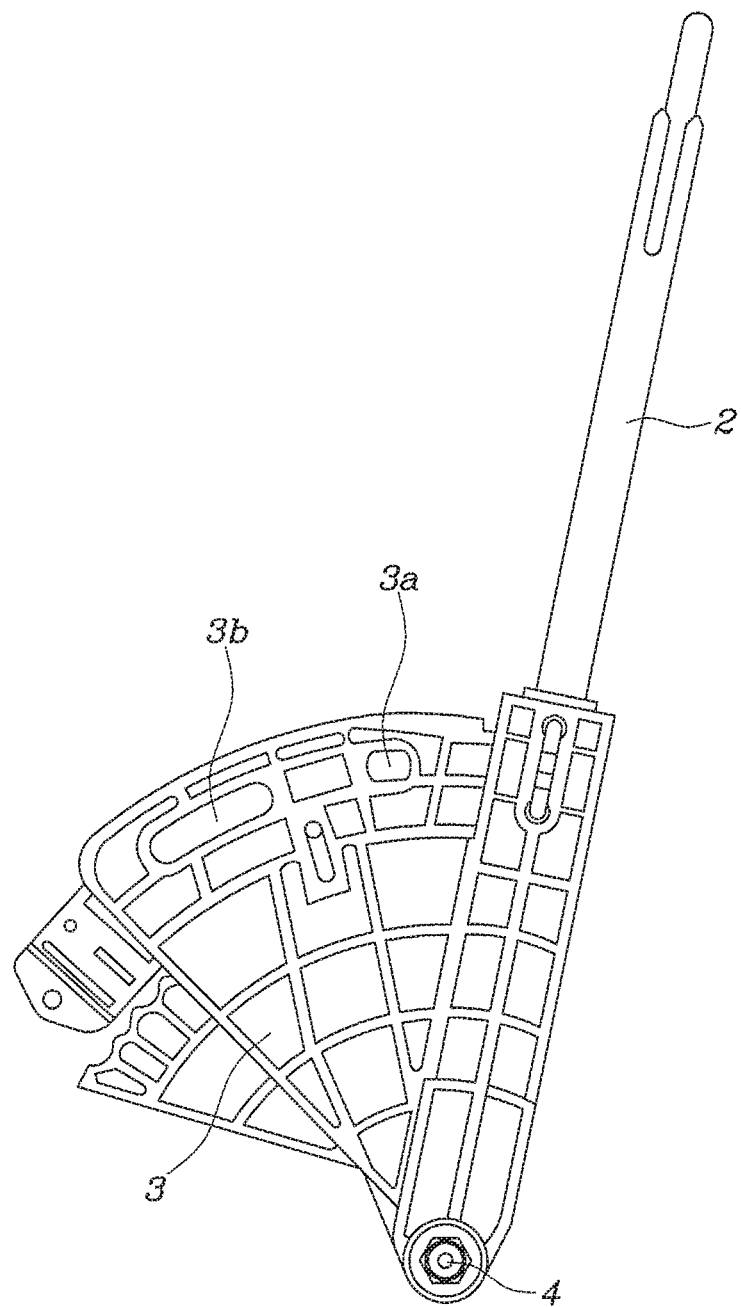
FIG. 3 is a side view showing a shift lever body having a shift lever of FIG. 1.
Figure 4:
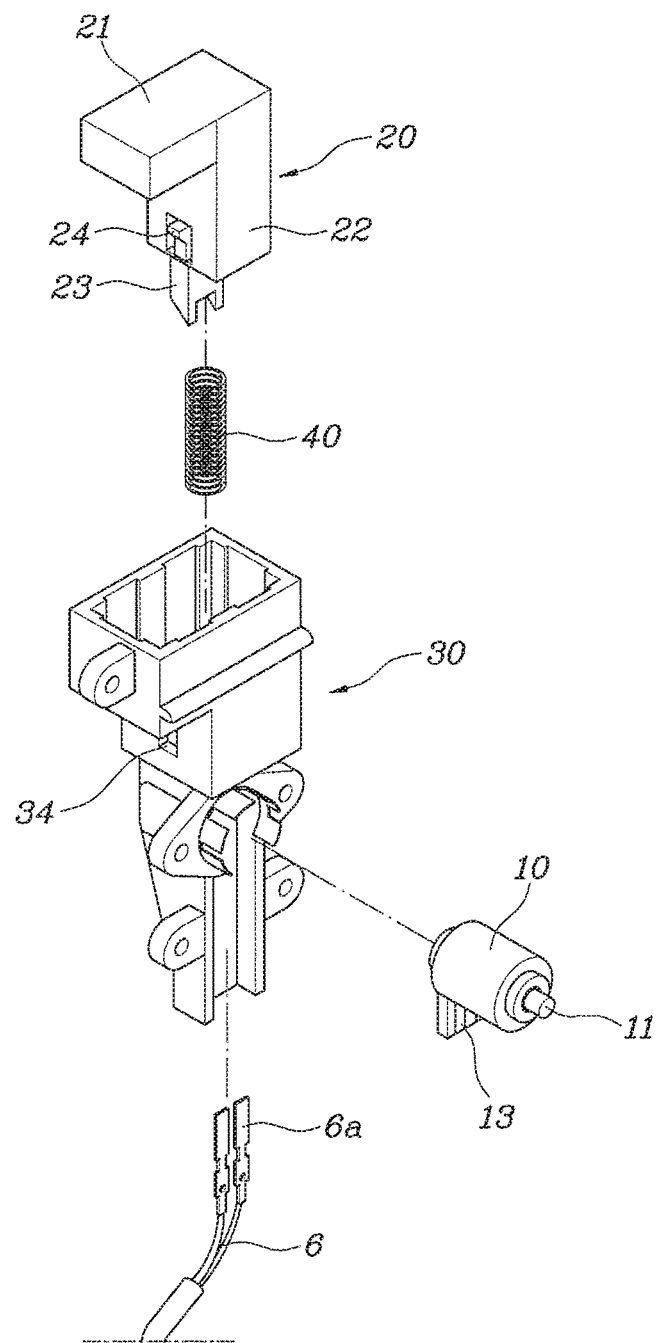
FIG. 4 is an exploded perspective view showing the integrated apparatus for implementing shift lock and shift lock release functions of an automatic transmission vehicle according to the present disclosure.
Figure 5:
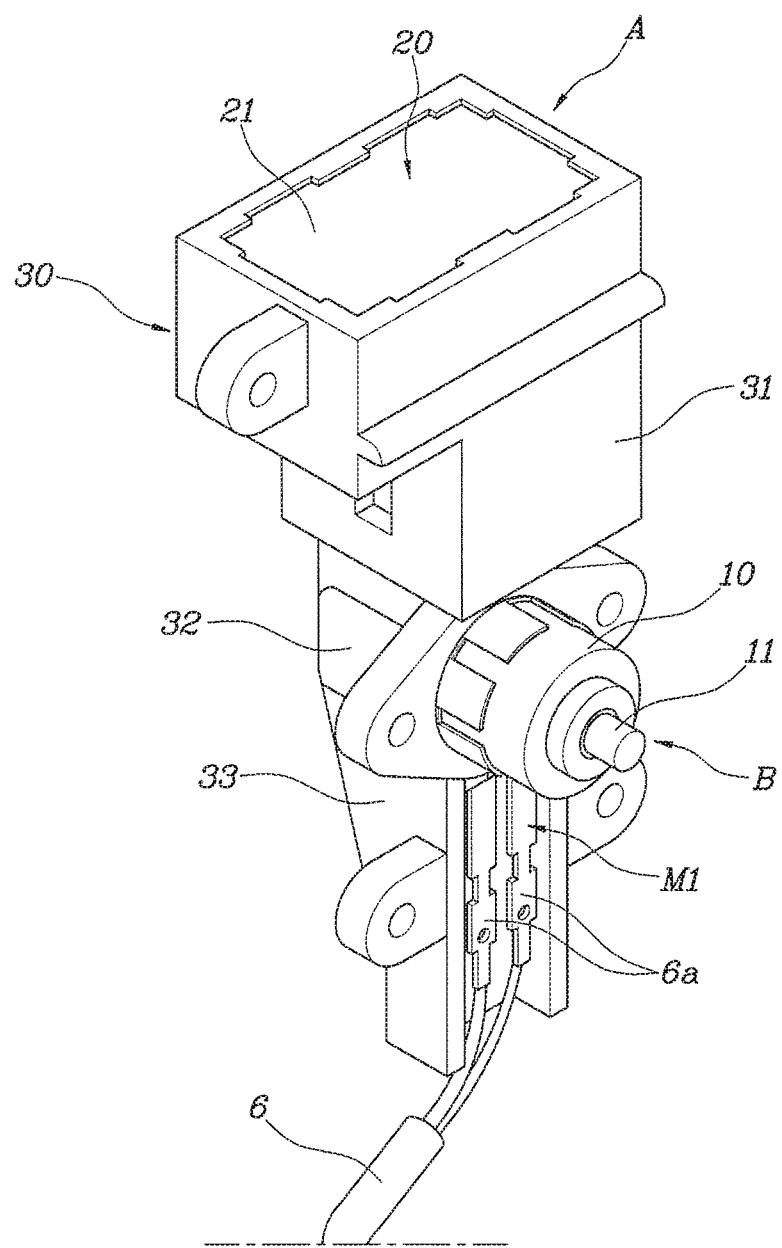
FIG. 5 is an assembled perspective view of FIG. 4.
Figure 6:
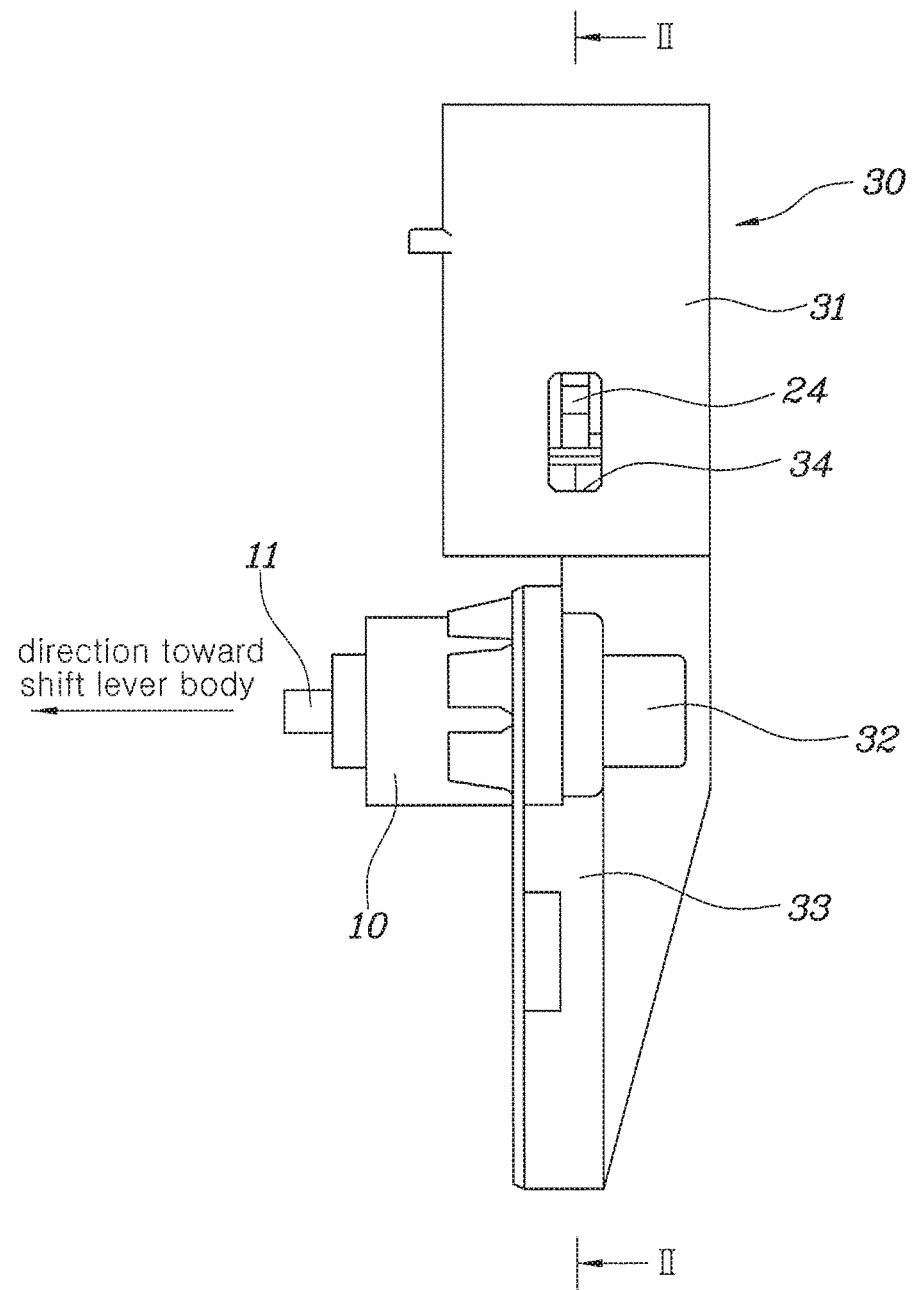
FIGS. 6 and 7 are views of FIG. 5 when viewed direction and B direction.
Figure 7:
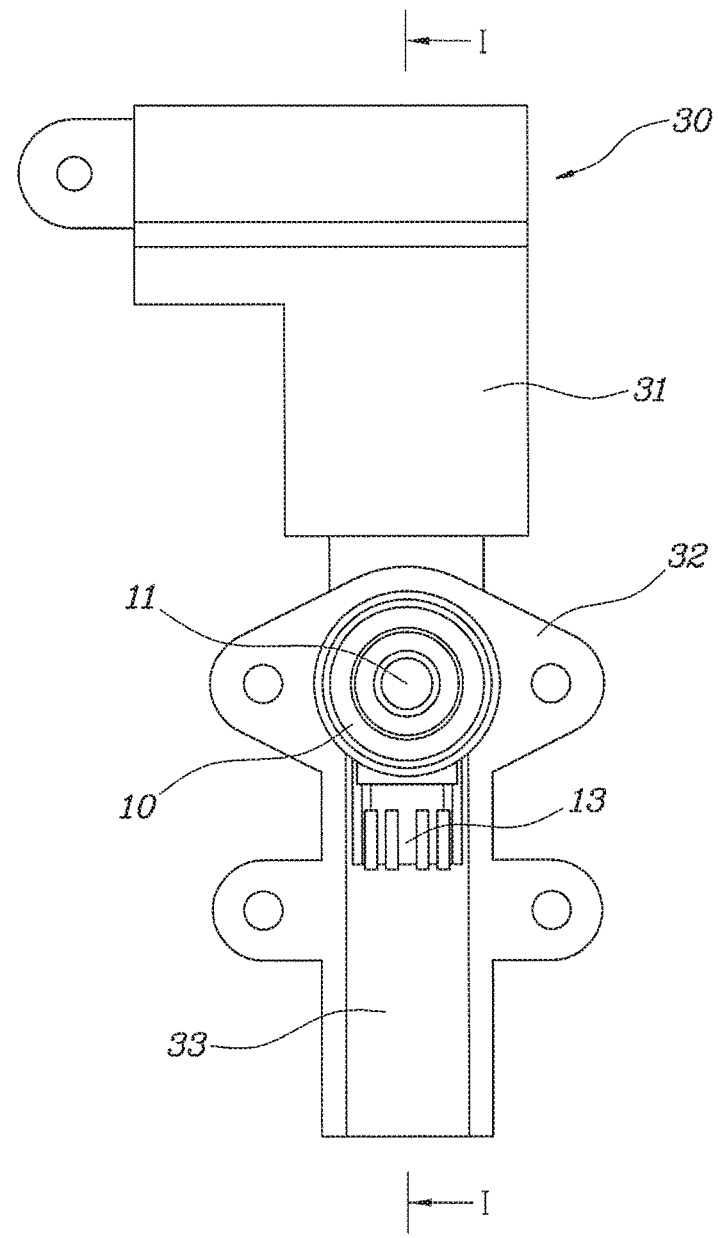
Figure 8:
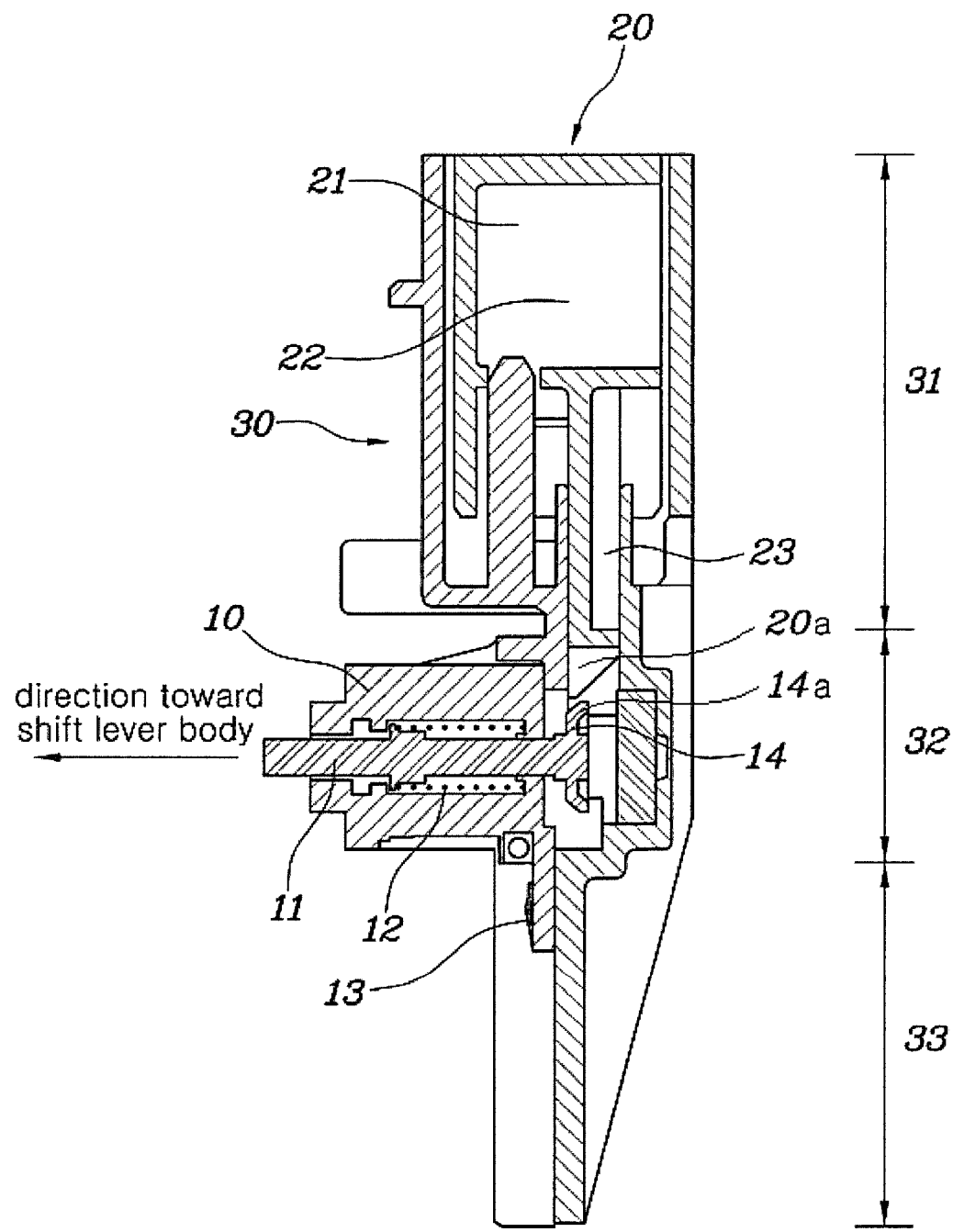
FIG. 8 is a sectional view taken along line I-I of FIG. 7.
Figure 9:
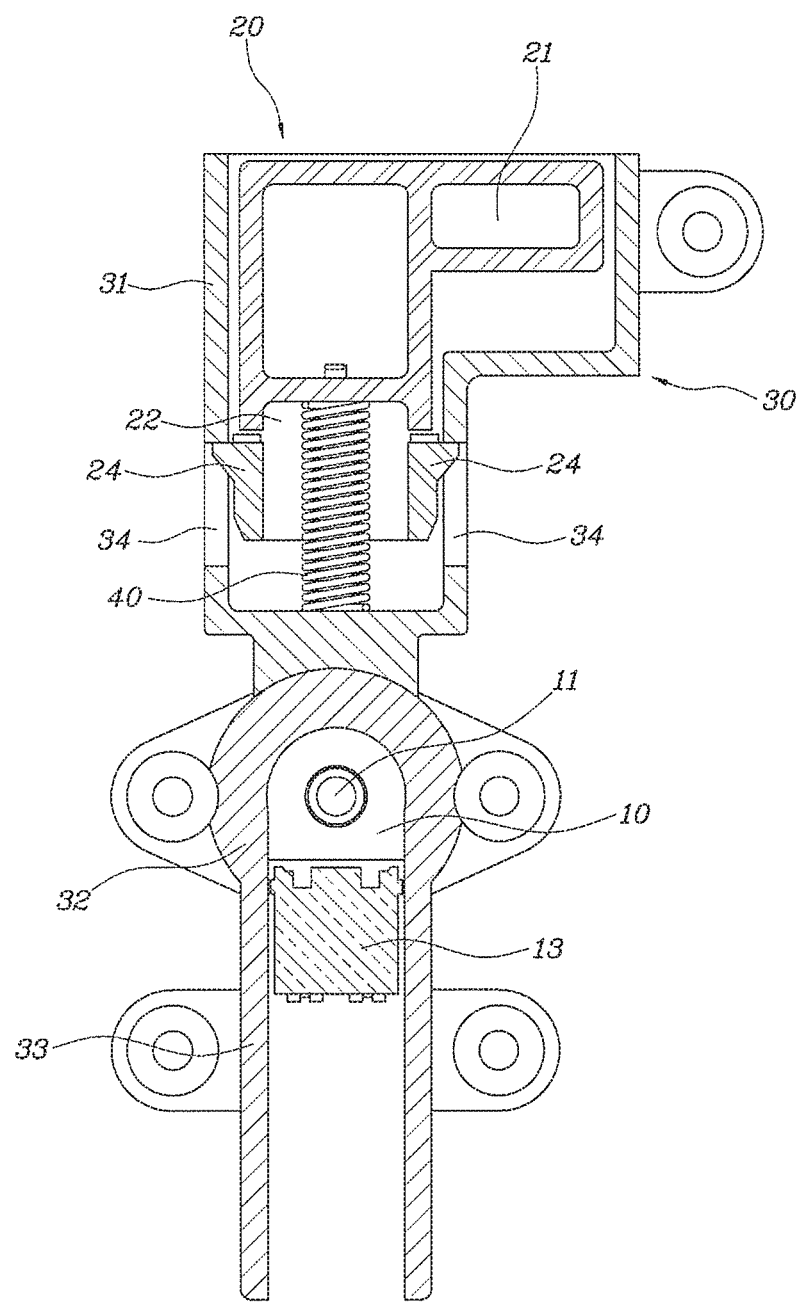
FIG. 9 is a sectional view taken along line II-II of FIG. 6.

Referring to FIG. 3, the plunger insertion groove 3a formed at a distance close to the shrift lever 2 is for implementing a P—position shift lock, and the oval plunger insertion groove 3b spaced apart from the plunger insertion groove 3a to the left is for implementing an R—position shift lock, wherein when the plunger 11 is stopped at the rightmost portion of the oval plunger insertion groove 3b, the R—position shift lock is implemented.

Figure 11:
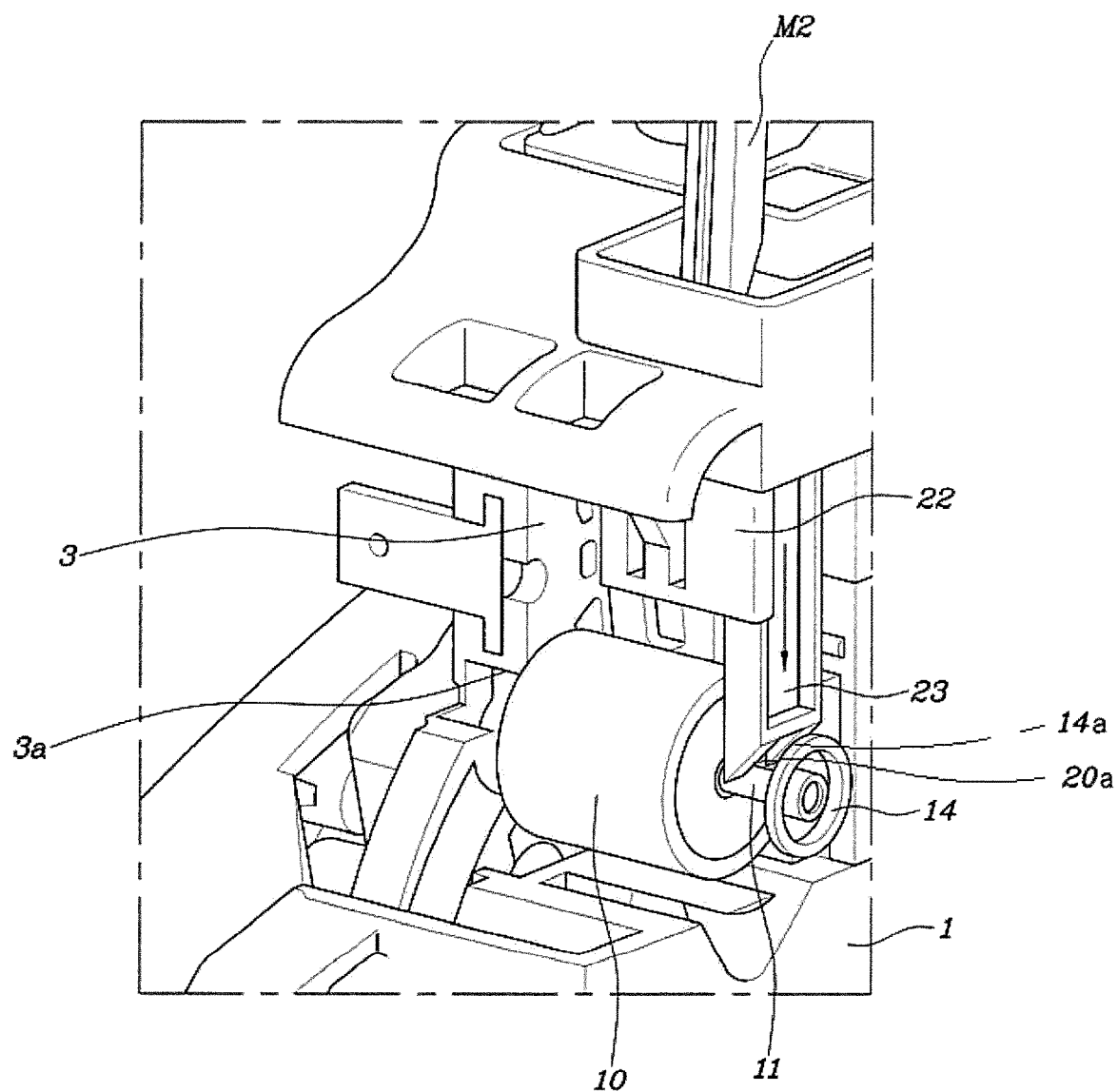

A plunger plate 14 having a diameter larger than diameter of the plunger 11 is coupled to the second end of the plunger 11; the shift lock release lever 20 comes into contact with the plunger plate 14 as shown in FIG. 11 when moving toward the shift lock solenoid 10 while overcoming an elastic force of the lever spring 40; when the shift lock release lever 20 and the plunger plate 14 are brought into contact with each other, the plunger 11 is forcibly moved backward away from the shift lever body 3 by receiving a moving force of the shift lock release lever 20; and when the plunger 11 is forcibly moved backward, the first end of the plunger 11 is separated from the plunger insertion groove 3 a, whereby a shift lock release function is implemented. The plunger plate 14 has a second slanted surface 14a at a circumference thereof to face with the first slanted surface 20a.

Reference numeral M2 in FIG. 11 designates a tool for pressing the shift lock release lever 20.

The shift lock release function is a safety function enabling manual release of the shift lock by the driver manipulating the shift lock release lever 20 to forcibly move the plunger 11 backward when the plunger 11 fails to be separated from the plunger insertion groove 3a due to a failure of the shift lock solenoid, etc. even though the driver presses the brake pedal in the state where the shift lock function is implemented by the plunger 11 inserted in the plunger insertion groove 3a.

The integrated apparatus according to the present disclosure is configured such that the shift lock solenoid 10 is coupled to a longitudinal middle position of the casing 30, the shift lock release lever 20 is coupled to the casing 30 at a location above the shift lock solenoid 10, the shift lock solenoid 10 is integrally provided with a solenoid terminal 13, and a junction M1 between the solenoid terminal 13 and the terminal 6a of the power line 6 is covered by a lower part of the casing 30 based on the shift lock solenoid 10.

In other words, the integrated apparatus according to the present disclosure is integrally modularized by the one casing 30 such that the shift lock release lever 20, the shift lock solenoid 10, and the junction M1, at which the solenoid terminal 13 and the terminal 6a of the power line 6 are connected, are arranged sequentially from the top along a longitudinal direction, whereby it is possible to make the overall size compact.

The casing 30 includes: an upper part 31 with the shift lock release lever 20 coupled thereto; a middle part 32 with the shift lock solenoid 10 coupled thereto; and a lower part 33 covering the junction M1 at which the solenoid terminal 13 and the terminal 6a of the power line 6 are connected, wherein the upper, middle, and lower parts 31, 32, and 33 are fixedly coupled to the shift lever housing 1, respectively by the medium of a coupling member 7 such as a screw.

In other words, since the shift lock release lever 20 is a component that moves up and down by the driver's operating force and the elastic force of the lever spring 40, the upper part 31 of the casing 30 with the shift lock release lever 20 coupled thereto may secure a strong supporting force. To achieve this, the upper part 31 of the casing 30 with the shift lock release lever 20 coupled thereto may be fixedly coupled to the shift lever housing 1 by the medium of the coupling member 7.

Further, since the shift lock solenoid 10 is a part where vibration occurs during operation of the plunger 11, it is desirable to secure a strong supporting force so as to prevent occurrence of vibration and noise due to vibration. To achieve this, the middle part 32 of the casing 30 with the shift lock solenoid 10 coupled thereto may be fixedly coupled to the shift lever housing 1 by the medium of the coupling member 7.

Further, if an external force or impact is exerted to the function M1 at which the solenoid terminal 13 and the terminal 6a of the power line 6, the electrical connection therebetween can be separated easily. To prevent this, the lower part 33 of the casing 30 covering the junction M1, at which the solenoid terminal 13 and the terminal 6a of the power line 6 are connected, may be fixedly coupled to the shift lever housing 1 by the medium of the coupling member 7.

The shift lock release lever 20 includes: an uppermost operation part 21 being coupled to the upper part 31 of the casing 30 to be movable up and down at a location above the shift lock solenoid 10, and receiving an operating force of the driver; a middle body part 22 extending downward from the operation part 21, and guiding up and down movements of the shift lock release lever; and a rod part 23 protruding downward from the body part 22, and coming into contact with the plunger plate 14 when the shift lock release lever moves down.

The shift lock release lever 20 is configured such that a cross-sectional area thereof is the largest in the operation part 21, the smallest in the rod part 23, and middle in the body part 22.

The operation part 21, which is a part receiving an operating force of the driver, may have the largest sectional area to effectively receive the operating force, and the body part 22 and the rod part 23 have smaller sectional areas than the operation part 21, whereby it is possible to reduce an overall size of the shift lock release lever 20, thereby achieving lightweightness.

The upper part 31 of the casing 30 with the body part 22 of the shift lock release lever 20 inserted thereinto has an oblong slot hole 34 at each of opposite side walls thereof; a stopper protrusion 24 provided in the body part 22 is inserted into the slot hole 34; and both the slot hole 34 and the stopper protrusion 24 guide up and down movements of the shift lock release lever 20, and prevent the shift lock release lever 20 from being separated from the casing 30.

As described above, the embodiment of the present disclosure is configured such that the shift lock solenoid 10 and the shift lock release lever 20 for implementing the shift lock and shift lock release functions are integrally modularized by one casing 30, whereby the installation space is minimized, and accordingly, it is possible to reduce an overall size and weight, and it is possible to considerably reduce the assembly variation, thereby ensuring excellent quality. Further, it is possible to ensure quick response in performing the shift lock or shift lock release, thereby improving quality.

Further, the present disclosure is configured such that the shift lock function is implemented by using only the shift lock solenoid 10, and the shift lock release function is implemented by the shift lock release lever 20 directly activating the shift lock solenoid 10, which enables eliminating the use of a middle component (a conventional shift lock lever) connecting the shift lock solenoid 10 and the shift lock release lever 20, whereby it is possible to reduce the number of components, cost, and weight. Further, it is possible to improve productivity by shortening the assembling time.

Although an exemplary embodiment of the present disclosure has been described for illustrative purposes, those skilled in the art will appreciate that various modifications, additions, and substitutions are possible, without departing from the scope and spirit of the invention as disclosed in the accompanying claims.

What is claimed is:

1. An integrated apparatus for implementing shift lock and shift lock release functions of an automatic transmission vehicle, the integrated apparatus comprising:
   a shift lock solenoid having a plunger capable of moving forward and backward;
   a shift lock release lever forcibly moving the plunger backward by coming into contact with the plunger when moving toward the shift lock solenoid; and
   a casing coupling the shift lock solenoid and shift lock release lever to be integrally modularized,
   wherein the casing is fixedly coupled to a shift lever housing,
   wherein the shift lever housing rotatably includes a shift lever body having a shift lever,
   wherein the plunger has a first end penetrating the shift lever housing to face the shift lever body,
   wherein the shift lock release lever includes:
      a first slanted surface at a lower end thereof; and
      a plunger plate having a diameter larger than a diameter of the plunger, the plunger plate coupled to a second end of the plunger,
   wherein the plunger plate has a second slanted surface at a circumference thereof to face with the first slanted surface,
   wherein the first slanted surface comes into contact with the second slanted surface when the shift lock release lever moves toward the shift lock solenoid,
   wherein, when the shift lock release lever and the plunger plate are brought into contact with each other, the plunger is configured to move backward away from the shift lever body by receiving a moving force of the shift lock release lever, and
   wherein, when the plunger moves backward, the shift lock release function is performed.

2. The integrated apparatus of claim 1, further comprising: a lever spring having opposite ends supported by the shift lock release lever and the casing, respectively, the lever spring providing a restoring force when the shift lock release lever moves.

3. The integrated apparatus of claim 1, wherein the plunger penetrates the shift lock solenoid, such that opposite ends of the plunger are exposed outside the shift lock solenoid.

4. The integrated apparatus of claim 3, wherein the first end faces the shift lever body that is coupled to the shift lever housing, and
   wherein the second end is disposed on a moving path of the shift lock release lever.

5. The integrated apparatus of claim 4, wherein the plunger moves backward away from the shift lever body when power is applied to the shift lock solenoid, and moves forward toward the shift lever body by an elastic force of a plunger spring when power is off.

6. The integrated apparatus of 5, wherein the shift lever body has a plunger insertion groove, and wherein the shift lock function is performed when the first end of the plunger is inserted in the plunger insertion groove.

7. The integrated apparatus of claim 1, wherein the shift lock solenoid is coupled to a longitudinal middle position of the casing, wherein the shift lock release lever is coupled to the casing at a location above the shift lock solenoid, wherein the shift lock solenoid integrally includes a solenoid terminal as part of the shift lock solenoid, and wherein a junction between the solenoid terminal and a power line is covered by a lower part of the casing based on the shift lock solenoid.

8. The integrated apparatus of claim 7, wherein the casing includes:

an upper part with the shift lock release lever coupled to the upper part of the casing;

a middle part with the shift lock solenoid coupled to the middle part of the casing; and the lower part covering the junction between the solenoid terminal and the power line, and wherein the upper, middle, and lower parts are fixedly coupled to the shift lever housing.

9. The integrated apparatus of claim 1, wherein the shift lock release lever includes:

an operation part being coupled to the casing to be movable up and down at a location above the shift lock solenoid, and receiving an operating force of a driver;

a body part extending downward from a lower portion of the operation part, and guiding up and down movements of the shift lock release lever; and a rod part protruding downward from the body part, and coming into contact with the plunger plate when the shift lock release lever moves down.

10. The integrated apparatus of claim 9, wherein a cross-sectional area of the shift lock release lever is largest in the operation part, smallest in the rod part, and middle in the body part.

11. The integrated apparatus of claim 9, wherein each of opposite sidewalls of the casing with the body part disposed in the casing includes an oblong slot hole, wherein a stopper protrusion of the body part is inserted into the slot hole, and wherein both the slot hole and the stopper protrusion guide up and down movements of the shift lock release lever, and prevent the shift lock release lever from being separated from the casing.

\* \* \* \* \*